(12) United States Patent
Innan et al.

(10) Patent No.: US 7,013,317 B2
(45) Date of Patent: Mar. 14, 2006

(54) METHOD FOR BACKUP AND STORAGE SYSTEM

(75) Inventors: Masataka Innan, Odawara (JP); Toshio Nakano, Odawara (JP); Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 452 days.

(21) Appl. No.: 10/290,931

(22) Filed: Nov. 7, 2002

(65) Prior Publication Data

US 2003/0088592 A1 May 8, 2003

(30) Foreign Application Priority Data

Nov. 7, 2001 (JP) ............................. 2001-342467

(51) Int. Cl.
*G06F 12/00* (2006.01)
(52) U.S. Cl. ............................. 707/204; 707/1; 707/10; 707/203
(58) Field of Classification Search ................ 707/204, 707/203, 1, 10
See application file for complete search history.

(56) References Cited

U.S. PATENT DOCUMENTS

2001/0056438 A1 * 12/2001 Ito ............................. 707/204

FOREIGN PATENT DOCUMENTS

| JP | 08-185346 | 7/1996 |
|---|---|---|
| JP | 2001-125815 | 5/2001 |
| JP | 2001-159993 | 6/2001 |

* cited by examiner

*Primary Examiner*—Charles Rones
*Assistant Examiner*—Belix M. Ortiz
(74) *Attorney, Agent, or Firm*—Townsend and Townsend and Crew LLP

(57) ABSTRACT

In a structure where first and second storage devices structure a mirrored pair, at a first time, an updating process to the second storage device is stopped, and management using first and second update-management tables is started. At a second time on or after the first time, management of the first update-management table is started from a non-updated state, and data of the second storage device, stored in the data blocks indicated by the second update-management table as being updated, is copied to a backup medium. At a third time after the second time, data of the first storage device, stored in the data blocks indicated by the second update-management table as being updated, is copied to data blocks of the second storage device corresponding to the data blocks of the first storage device.

5 Claims, 3 Drawing Sheets

FIG. 2 FLOW FOR OBTAINING BACKUP UNTIL OCCURRENCE OF SOFTWARE ERROR

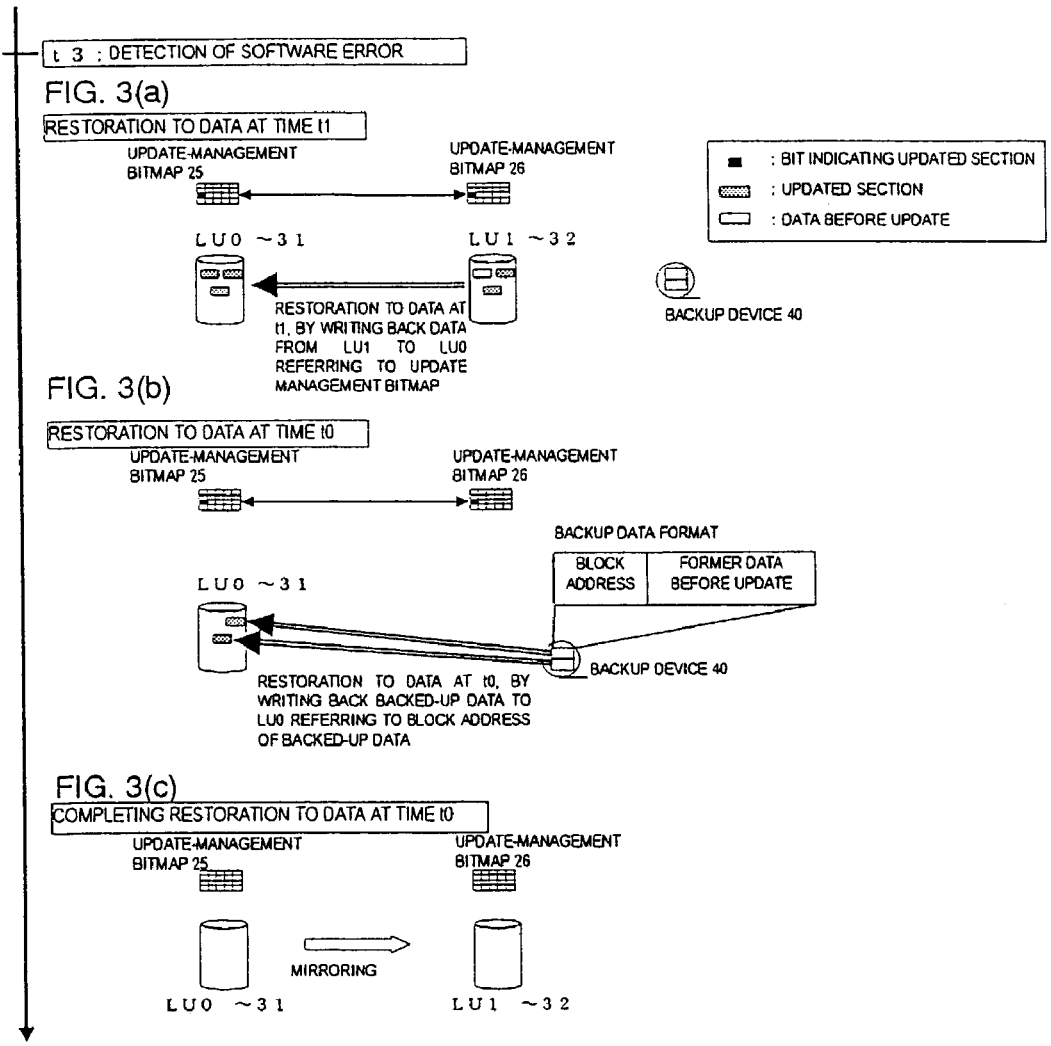
FIG. 3 FLOW FOR RESTORING DATA USING BACKED UP DATA

METHOD FOR BACKUP AND STORAGE SYSTEM

CROSS REFERENCES TO RELATED APPLICATIONS

The present application claims priority upon Japanese Patent Application No. 2001-342467 filed on Nov. 7, 2001, which is herein incorporated by reference.

BACKGROUND OF THE INVENTION

1. Field of the Invention

The present invention relates to a method of managing backup of data, and particularly relates to a technique for efficiently performing management of generation of backed-up data in a case where storage devices are operated according a mirroring method.

2. Description of the Related Art

There exist various mechanisms in the art relating to methods for managing backup of data stored in a storage system such as a disk array device. For example, in Japanese Patent Application Laid-open Publication No. 2001-159993, there is disclosed a mechanism for restoring a database to a state at an arbitrary point of time in the past by, upon updating a database, storing data before update in a section for accumulating history, and managing information before update by taking an update time as a key. Further, in Japanese Patent Application Laid-open Publication No. 2001-125815, there is disclosed a method wherein, when an updating process is executed by a host device in view of a storage subsystem, a log containing a data-write time, a location at which data is stored, and data contents is obtained, and restoration of data is performed according to this log. Further, in Japanese Patent Application Laid-open Publication No. 8-185346, there is disclosed a data copying method wherein: a device to be backed up (a "to-be-backed-up device") and a device used for backup (a "backup device") are connected via a network; a table for managing update history (an "update-history management table") is provided in the to-be-backed-up device; and with reference to the update-history management table, data in the to-be-backed-up device is copied to the backup device in a delayed manner by transmitting data in the to-be-backed-up device to the backup device in time series across a communication line.

Upon data restoration, it is ideal to restore data to a state as close as possible to that right before occurrence of trouble, in order to minimize time and/or effort for performing re-inputting and re-updating of data. Therefore, in managing data backup, it is essential to provide a mechanism for managing the generation of the backed-up data. However, in order to perform generation management, it is necessary to provide, for example, a mechanism for periodically performing backup and/or a mechanism for accumulating and recording a data-update log; this tends to lead to system complication and increase in operation load.

Meanwhile, in recent storage systems such as disk array devices, there are many cases where a method so-called mirroring (or RAID 1) is applied. Here, the same data is synchronously managed among the two storage devices X, Y which structure a mirrored pair, and the storage devices X, Y are in a relationship where the units mutually back up the data stored respectively in each of the units.

The present inventors have conceived a backup-management method capable of efficiently performing generation management by applying such a mirroring mechanism.

SUMMARY OF THE INVENTION

The present invention has been contrived based on the above-mentioned and other circumstances, and one object is to provide a backup-management method capable of efficiently performing management of generation of backed-up data in a case where storage devices are operated according a mirroring method.

Thus, one aspect of the present invention is a method for managing backup of data stored in first and second storage devices structuring a mirrored pair. The method may comprise: at a first time, (a) stopping a process of carrying out updating to the second storage device, and (b) starting a process of managing whether updating is carried out or not to each of data blocks of the first and second storage devices using first and second update-management tables; the data blocks being respectively partitioned in the first and second storage devices; and the first and second update-management tables corresponding respectively to the first and second storage devices and respectively indicating any update to each of the data blocks of the respective first and second storage devices; at a second time which may be after the first time or at the same time as the first time, (c) starting management of the first update-management table from a state in which no update has been carried out to contents of the first update-management table, and (d) copying, to a backup medium, data of the second storage device stored in at least one of the data blocks indicated by the second update-management table as being updated; and at a third time which is after the second time, (e) copying data of the first storage device stored in at least one of the data blocks indicated by the second update-management table as being updated to at least one of data blocks of the second storage device corresponding to the data blocks of the first storage device, and (f) then making contents of the second update-management table coincide with contents of the first update-management table.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 3 is a diagram explaining a data-restoration process in the backup-management method according to one example of the present invention, wherein FIG. 3(a) relates to restoration to data at time t1, FIG. 3(b) relates to restoration to data at time t0, and FIG. 3(c) relates to a state in which data restoration to time t0 is completed.

DESCRIPTION OF THE PREFERRED EMBODIMENTS

At least the following matters will be made clear by the explanation in the present specification and the description of the accompanying drawings.

Figure 1:
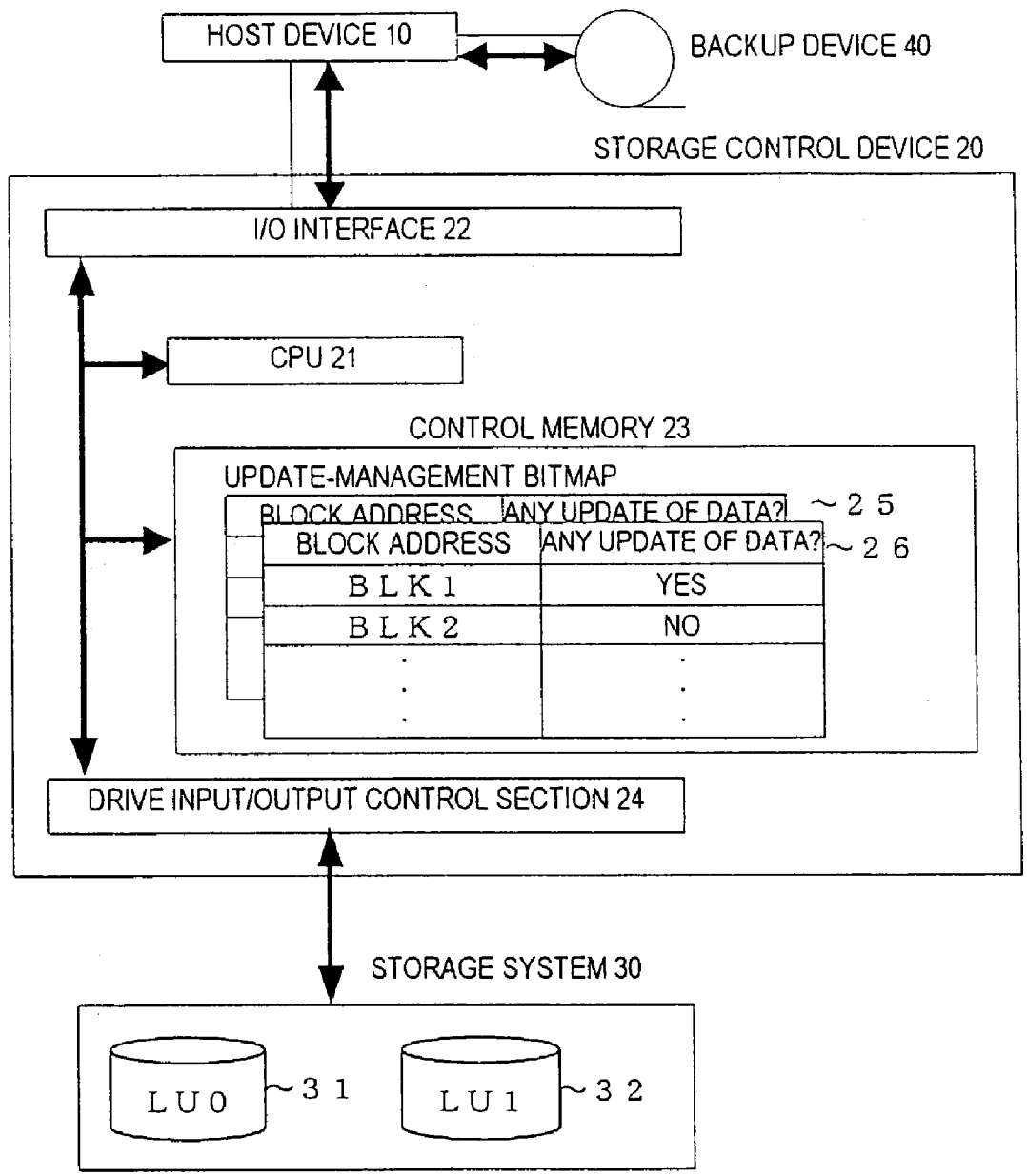
FIG. 1 is a diagram showing a schematic structure of a system for explaining a backup-management method according to one example of the present invention.

FIG. 1 shows a schematic configuration of a system comprising, for example, a host device 10, a storage control device or a storage controller 20, and a storage system 30, which system is used for explaining one example of a backup management method according to an embodiment of the present invention.

The host device 10 may be structured by, for example, a mainframe computer or a personal computer. A backup device 40 is connected to the host device 10 via an interface such as SCSI, Fibre Channel, or any other appropriate interface. The backup device 40 may be, for example, a magnetic tape device or a DAT (digital audio tape) device.

The storage control device 20 may comprise, for example, a CPU 21; an input/output (I/O) interface 22 for connection with the host device 10; a control memory 23; an I/O-control section 24 for carrying out input and output to/from the storage system 30. The storage control device 20 is connected to the host device 10 via an interface such as SCSI, Fibre Channel, or any other appropriate interface.

The storage system 30 is, in this example, a disk array device equipped with at least one disk unit for providing a storage device, and is connected to the storage control device 20 via an interface such as SCSI or other appropriate interfaces.

The storage control device 20 manages storage areas provided by the disk units, using logical units (herein also referred to as "LU") formed by using one or more storage areas of one or a plurality of disk units, and data blocks partitioned in the logical units. Note that the logical units are identified by LUNs (Logical Unit Numbers), and the data blocks are designated by block addresses.

<Backup>

Figure 2A:
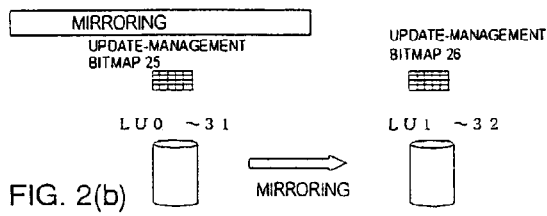
FIG. 2 is a diagram explaining a backup process in the backup-management method according to one example of the present invention, wherein FIG. 2(a) relates to mirroring, FIG. 2(b) relates to mirror splitting, FIG. 2(c) relates to data backup, FIG. 2(d) relates to updating during data backup, and FIG. 2(e) relates to data copying.

Next, a backup management method according to one aspect of the present invention, which method being carried out in the system structured as above, will be explained. As shown in FIG. 2(a), the storage control device 20 carries out mirroring (RAID 1) between the pair LU0 (31) and LU1 (32). The storage control device 20 also stores and manages update-management bitmaps 25, 26 in the control memory 23. The bitmaps 25, 26 correspond respectively to the LU0 (31) and LU1 (32). An "update-management bitmap" is a table for managing whether a process of updating of data stored respectively in the data blocks of the LU0 (31) and/or LU1 (32) has been carried out by turning on/off of the bits corresponding to the data blocks.

Figure 2B:
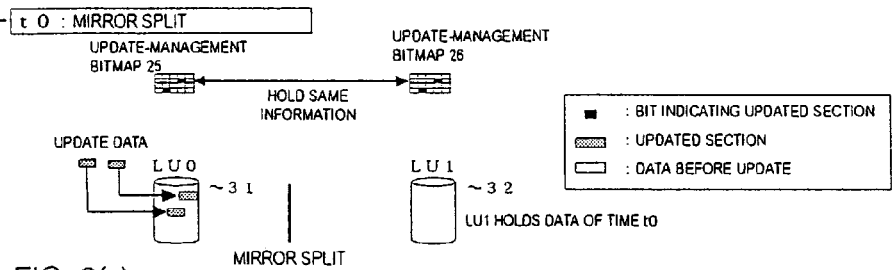

Upon backup, firstly, as shown in FIG. 2(b), a mirror-split request is sent from the host device 10 to the storage control device 20. Here, "mirror-split" refers to an operation state in which updating to the LU0 (31) is continued, but updating to the LU1 (32) is stopped. Having received the mirror-split request, the storage control device 20 starts operation in the mirror-split state. The time at which the mirror-state operation starts is referred to as "time t0". At time t0, the storage control device 20 starts an updating process of the update-management bitmaps 25, 26. Note that, by starting to operate in the mirror-split state, on or after time t0, the LU1 (32) remains in the same state as that at time t0.

Figure 2C:
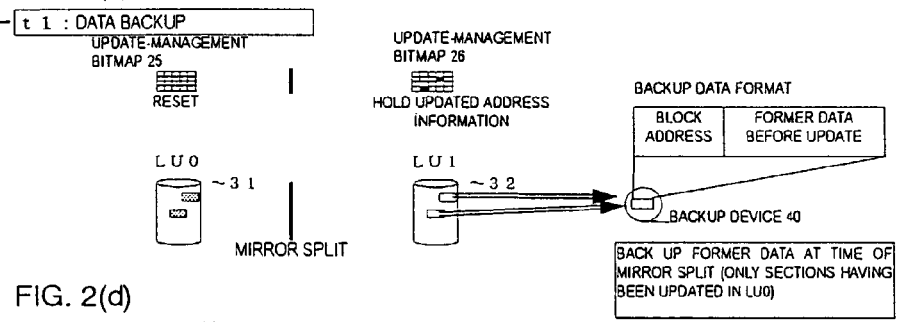

Next, as shown in FIG. 2(c), the host device 10 sends a backup-start request to the storage control device 20 at time t1 (t0≦t1) which is a time on or after starting operation in the mirror-split state. Having received the backup-start request, the storage control device 20: sets the bits in the update-management, bitmap 25 for all of the data blocks in an "off" state (indicating that there is no update); and, on the other hand, stops to carry out the updating process to the update-management bitmap 26. Accordingly, in the update-management bitmap 25, the updating condition for each of the data blocks of the LU0 (31) will be managed taking time t1 as a starting point; whereas, in the update-management table 26, the update condition will be maintained in a state at time t1.

Next, the storage control device 20 backs up, to a backup medium, data stored in the data blocks of the LU1 (32) in which the corresponding bits in the update-management bitmap 26 are turned "on" (indicating that there was updating). Note that, since updating has been stopped for the LU1 (32) after time t0, the data being backed up is data at time t0.

Backup is carried out according to a series of processes in which: firstly, the storage control device 20 transfers to the host device 10 the data stored in the data blocks of the LU1 (32) in which the corresponding bits in the table 26 are turned "on" (indicating that there was updating); the host device 10 further transfers the above-mentioned transferred data to a backup device 40; and the backup device 40 copies the data sent from the host device 10 to a backup medium such as a magnetic tape and/or a DAT tape. Note that a block address indicative of the data block in which the data was stored may be attached to the data to be recorded on the backup medium.

Figure 2D:
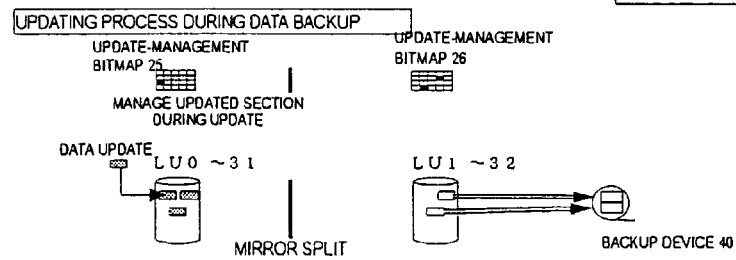

As shown in FIG. 2(d), the LU0 (31) is in a state in which the host device 10 may use the LU0 (31) even on or after time t1; and the updating process to LU0 (31) is carried out in a normal manner, even during the backup period on or after time t1.

Figure 2E:
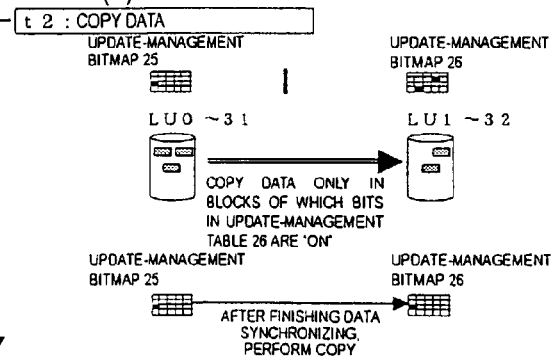

Next, at time t2 (t1<t2) which is a time after the above-mentioned backup process has finished, as shown in FIG. 2(e), the storage control device 20 refers to the update-management bitmap 26, and copies the data in the data blocks of the LU0 (31) in which the bits in bitmap 26 are turned "on" (indicating that there was updating) to the data blocks of the LU1 (32) corresponding to the data blocks in the LU0 (31). Note that, as described above, since the backup process to the update-management bitmap 26 has been stopped after time t1, the data to be copied is data in the data blocks of the LU0 (31) which have been updated during the time from when the mirror-split state started (time t0) to the time when the data backup started (time t1). According to this copying process, the contents of the LU1 (32) will be in the same state as the LU0 (31) at time t1 which is a time when the backup process started. After the above-mentioned copying process, the storage control device 20 makes the contents of the update-management bitmap 26 coincide with the contents of the update-management bitmap 25.

<Data Restoration>

Next, explanation will be made with reference to FIG. 3(a)–FIG. 3(c) regarding a process relating to data restoration in a case where data restoration becomes necessary at time t3 such as where, for example, a software error is detected.

FIG. 3(a) shows an example of restoring the data to a state at time t1. As described above, the LU1 (32) is maintained in the state of LU0 (31) at time t1. Further, information indicative of whether update of data was conducted on or after time t1 is reflected to the update-management bitmaps 25, 26. Thus, it is possible to restore the contents of the LU0 (31) to a state at time t1 by copying, to the LU0 (31), the data of the LU1 (32) stored in the data blocks in which the bits are turned "on" (indicating that there was updating) in either one of the update-management bitmaps 25, 26. Upon this restoration process, since it is necessary to copy only the data of LU1 (32) stored in the data blocks in which the bits are turned "on" (indicating that there was updating) in the update-management bitmaps 25 and/or 26, process load can be kept to a minimum, and process time will be short.

On the other hand, FIG. 3(b) shows an example of a process in case of restoring the data to a state at time t0. In this example, as explained above, the backup medium stores the data at time t0 stored in the data blocks that had been updated during time t0 and time t1. Accordingly, it is possible to restore the data to a state at time t0 by writing the data, in view of the data blocks in which the bits are turned "on" (indicating that there was updating) in the update-management bitmaps 25 and/or 26, back from the backup medium to the LU0 (31). Upon this restoration, since it is necessary to write, from the backup medium, only the data of the data blocks in which the bits are turned "on" (indicating that there was updating) in the update-management bitmaps 25 and/or 26, process load can be kept to a minimum, and process time will be short.

<Other examples>

In the above-mentioned example, a structure has been adopted in which the host device 10 sends the backup request. However, it may be structured so that the storage control device 20 generates the backup request.

In the above-mentioned example, the storage control device 20 and the storage system 30 are structured independent of each other. However, the storage control device 20 and the storage system 30 may be structured integrally.

The storage system 30 does not have to be a disk array device, but various other examples such as semiconductor disk devices may be considered.

In the above-mentioned example, an explanation was made in which the storage control device 20 carries out mirroring on a logical unit basis, i.e., between logical units. However, needless to mention, the present invention may be applied to structures in which mirroring is carried out on a physical unit basis, i.e., between physical units.

According to the backup management method of the present invention, it is possible to efficiently perform management of backed-up data generation in a case where storage devices are operated according a mirroring method.

Although the preferred embodiment of the present invention has been described in detail, it should be understood that various changes, substitutions and alterations can be made therein without departing from spirit and scope of the inventions as defined by the appended claims.

What is claimed is:

1. A method for managing backup of data stored in first and second storage devices structuring a mirrored pair, said method comprising:
   at a first time,
   (a) managing whether updating is carried out or not to each of data blocks of said first and second storage devices using first and second update-management tables; said data blocks being respectively partitioned in said first and second storage devices; and said first and second update-management tables corresponding respectively to said first and second devices and respectively indicating any update to each of said data blocks of said respective first and second storage devices,
   (b) stopping a process of carrying out updating to said second storage device, and
   (c) starting an updating process of said second update-management table to hold the same information as said first update-management table;
   at a second time which is after said first time or at the same time as said first time,
   (d) stopping said updating process of said second update-management table,
   (e) resetting said first update-management table to a state in which no update has been carried out to the data blocks of said first storage device, and
   (f) copying, to a backup medium, data of said second storage device stored in at least one of said data blocks indicated by said second update-management table as being updated; and
   at a third time which is after said second time,
   (g) copying data of said first storage device stored in at least one of said data blocks indicated by said second update-management table as being updated to at least one of data blocks of said second storage device corresponding to said data blocks of said first storage device, and
   (h) then making contents of said second update-management table coincide with contents of said first update-management table.

2. A method for managing backup of data according to claim 1, comprising,
   upon copying of the data of said second storage device to said backup medium in said step (f), attaching information designating said data block in which said data was stored to said data.

3. A method for managing backup of data according to claim 1, comprising
   writing, to said first storage device or said second storage device, the data copied to said backup medium to restore data in either or both said first and second storage devices to a state at said first time.

4. A method for managing backup of data according to claim 1, comprising,
   after carrying out said step (h), copying to said first storage device the data stored in at least one of said data blocks of said second storage device corresponding to at least one of said data blocks indicated by said first update-management table as being updated, to restore said storage device to a state at said second time.

5. A storage control device used for a method of managing backup of data according to claim 1, said storage control device comprising:
   means for reading/writing to/from said first and second storage devices according to a request from a host device connected to said controller via a communication means;
   means for reading/writing to/from said backup medium; and
   means for carrying out said steps (a)–(h).

* * * * *